SOUND RECORDING AND REPRODUCING APPARATUS

Filed Sept. 12, 1949 2 Sheets-Sheet 1

ARTHUR C. DAVIS,
INVENTOR.

BY [signature]

ATTORNEY.

July 28, 1953 A. C. DAVIS 2,646,989

SOUND RECORDING AND REPRODUCING APPARATUS

Filed Sept. 12, 1949 2 Sheets-Sheet 2

ARTHUR C. DAVIS,
INVENTOR.

BY C. A. [signature]

ATTORNEY.

Patented July 28, 1953 2,646,989

UNITED STATES PATENT OFFICE 2,646,989

SOUND RECORDING AND REPRODUCING APPARATUS

Arthur C. Davis, Burbank, Calif.

Application September 12, 1949, Serial No. 115,297

4 Claims. (Cl. 274—4)

This invention relates to improvements in sound recording and reproducing equipment and is particularly directed to improved means for handling sound recordings magnetically recorded upon a continuous tape. The tape may be cellulosic and provided with a magnetizable deposit or coating or the tape may be of any other suitable material capable of receiving and carrying a reproducible record of audible sounds of various types.

Although magnetic recordings upon filamentary carriers have been available for many years, adequate synchronized equipment for effectively handling such tape has not been made available. The present invention is particularly directed to apparatus which may be used for recording or reproducing magnetic recordings from filamentary tapes, the apparatus being arranged so as to permit the tape to be driven at a uniform, constant speed without the introduction of variations, flutters, and other deviations which impair the quality and characteristics of the sound being either reproduced or recorded.

The invention, moreover, pertains to a construction which permits recording and/or reproduction to be carried out in the same piece of equipment without interference due to the proximity of amplifiers, oscillators or other electrical units which may be employed in the recording or reproduction and amplification of sound. As a result, the devices of the present invention may be embodied in a complete, compact, and portable sound recording or reproducing unit and it is not necessary to isolate the recording head or heads from the rest of the equipment.

Furthermore, the invention describes means and methods of mounting the driving means in such manner that positive, uniform speed is imparted to a film provided with sprocket holes and employing driving sprockets without the generation of sidebands, vibrations, or flutter which may impair the quality of the recordings. The present invention utilizes resistance of the film to variable flexure as a primary damping means and eliminates the use of dashpots.

The above and various other objects and advantages of the present invention will become apparent to those skilled in the art from the following description of exemplary forms embodying the construction. In order to facilitate understanding reference will be had to the appended drawings in which.

Figure 2:
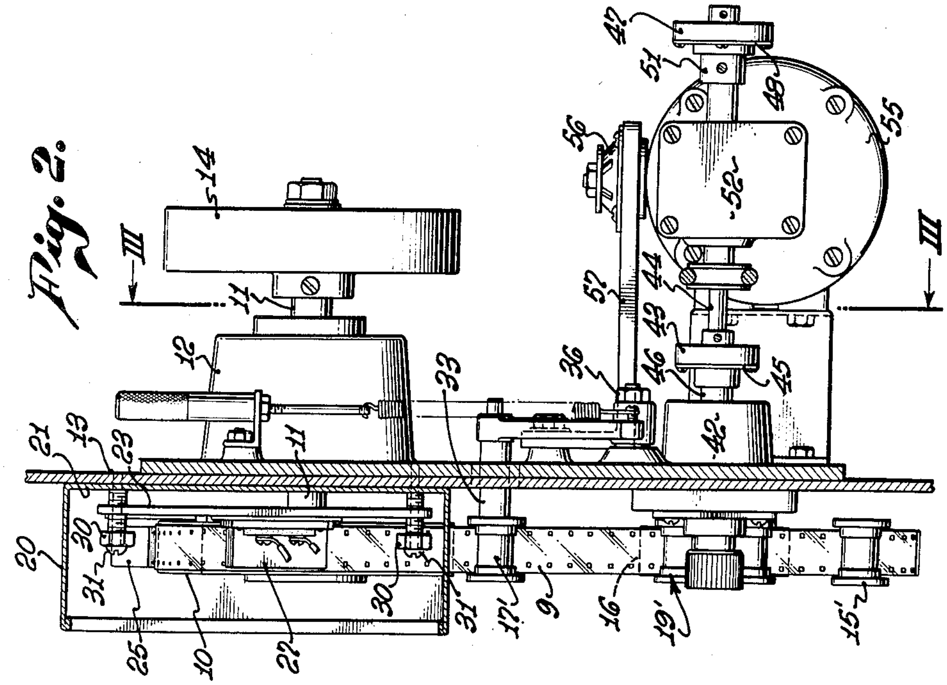
Fig. 2 is a side elevation, partly in section, illustrating the recording and reproducing head and the motor drive.
Figure 1:
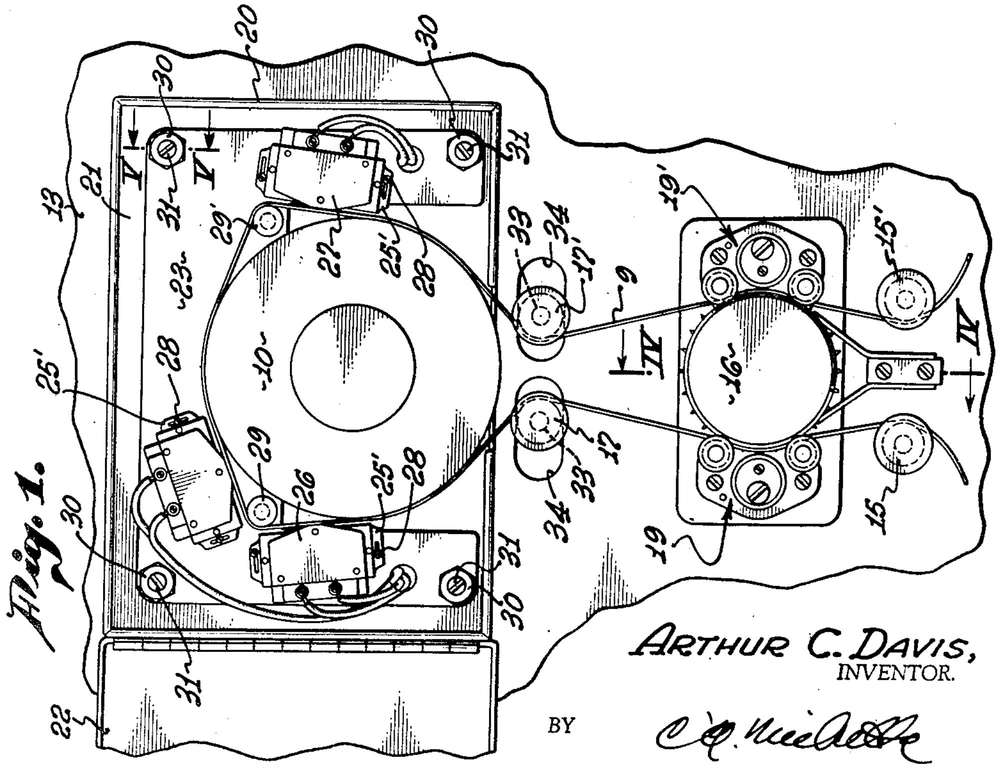
Fig. 1 is a front view of a portion of a film recording and reproducing device, the cover of the housing being illustrated in open position.

As best shown in Figs. 1 and 2, the recorder is provided with a freely-journaled, smooth-spaced, weighted recording and reproducing drum 10 arranged to frictionally receive strip film over the major portion of its periphery. The drum 10 may be carried by a shaft 11 journaled in a suitable bearing 12 carried by the panel 13 of the reproducing unit. The shaft may be provided with a heavy flywheel 14.

In actual practice the strip film 9 (or other filamentary carrier) is carried upon a suitable reel or magazine and after passing over the drum 10 is wound upon another reel or magazine. These reels are not shown in the drawings since they are well known in the art and the path of the film as illustrated in Fig. 1 includes passage of the film past a guide roller 15 into engagement with the sprocket 16 into contact with a stabilizing roller 17 then over the surface of the drum 10 past another stabilizing roller 17' into contact with the driven sprocket 16 and out by way of the guiding roller 15'. Suitable selectively operable pressure roller assemblies 19 and 19' normally keep the film 9 in positive engagement with the sprocket 16.

The drum 10 is positioned within a pickup and recording case 20 constituting a magnetic shield and made of metals which adequately and completely shield the pickup and reproducing heads. Preferably the pickup case is made of laminated construction, for example, a layer of copper and two layers of MU metal. The case 20 may be provided with side walls, top and bottom walls (the bottom being ported so as to permit entry and withdrawal of the film 9) and a back wall 21. The front of the case may be open and capable of being electively closed by means of a hinged door 22. The entire case may be grounded.

Positioned within the case surrounding the drum 10 is a head mounting plate 23. The head mounting plate 23 carries a recording head indicated at 25, an erasure head 26, and a pickup or reproducing head 27. The head mounting plate 23 may be U-shaped so as to straddle the shaft 11 of the drum and is supported from the back wall 21 of the pickup case by adjustable means whereby the distance of the plate from the back wall may be varied so as to place the various heads 25—27 along one margin or the other of the film 9 or at any intervening position. It is to be understood that since the magnetic recording itself may be quite narrow a number of longitudinally extending parallel recordings may be carried by a single strip of film.

Figures 3, 4, 5, 6, 7:
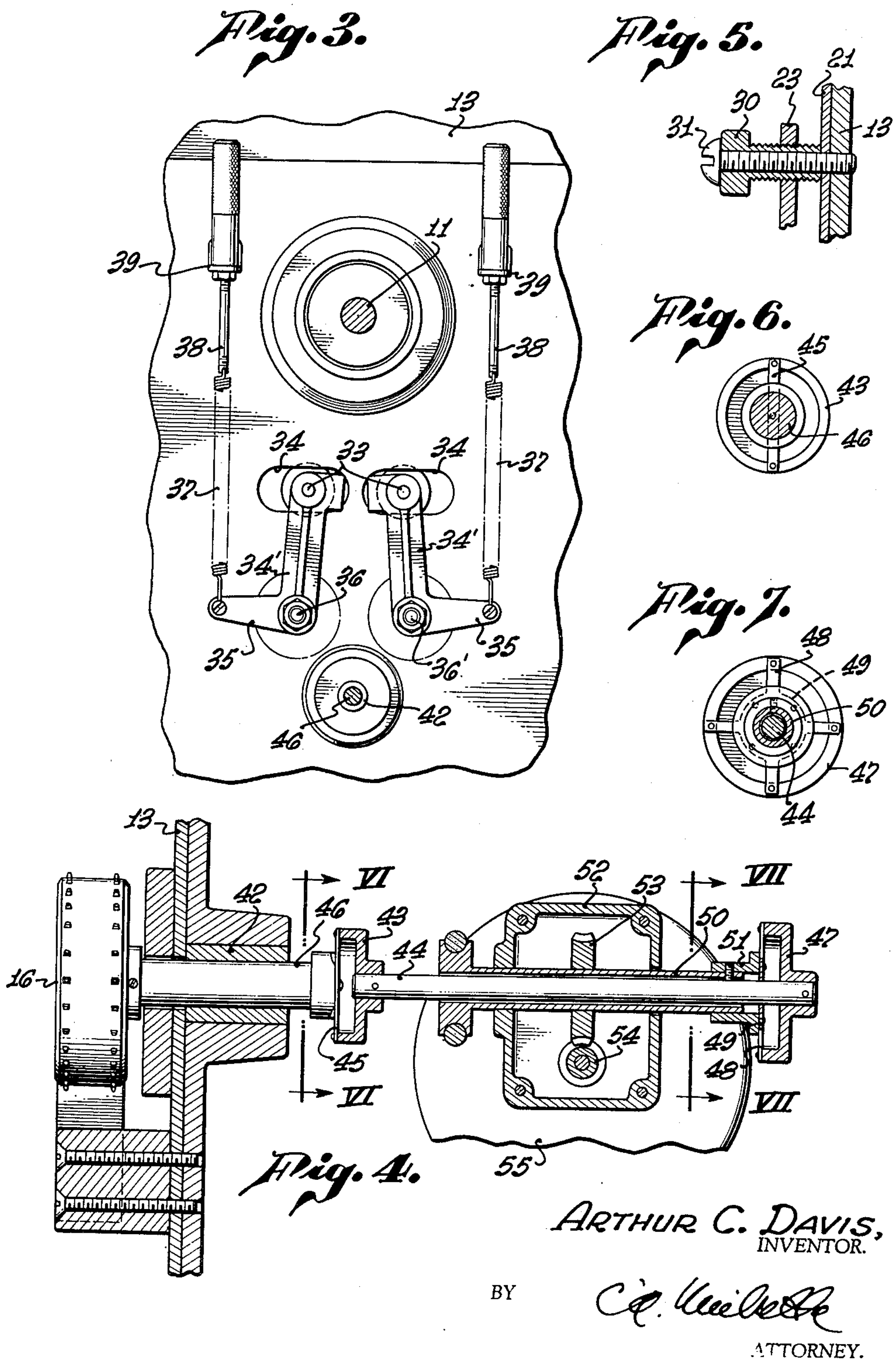
Fig. 3 is a rear view taken along the plane III—III of Fig. 2 showing the arrangement of stabilizing means.
Fig. 4 is a transverse section taken along the plane IV—IV in Fig. 1 on an enlarged scale illustrating a preferred driving connection.
Fig. 5 is an enlarged partial section of an adjustment means, said section being taken along the plane V—V in Fig. 1.
Figs. 6 and 7 are transverse sections taken along planes VI—VI and VII—VII in Fig. 4, illustrating in greater detail portions of the driving connections.

The adjustably positionable means for holding the plate in a selected plane transverse to the axis of the drum 10 is well illustrated in Fig. 5. As there shown, the plate 23 carries a hollow stud 30 in threaded engagement with an internally threaded port in the plate 23, the base of such stud resting against the bottom or back wall 21 of the pickup case. Extending through the hollow stud 30 is a fastening screw 31 in threaded engagement with the bottom of the case 21 and the supporting panel 13. It will be evident that by loosening the fastening screw 31 the stud 30 may be rotated so as to move the entire head mounting plate 23 into a desired plane, since the rest of the hollow stud is several times the thickness of the plate 23.

Details as to construction of the various heads 25—27 are not necessary here but attention may be drawn to the fact that each of the heads is provided with its own base plate such as 25′ having slots in each and fastening screws 28 extending through said slots into the mounting plate 23. In this manner each of the heads 25—27 may be moved toward or away from the surface of the drum 10.

It is also to be noted that a small idler roller such as 29 is carried by the head mounting plate 23 between the heads 25 and 26 and the film 9 may be caused to pass over this roller or selectively be carried by the surface of the drum 10 beneath such roller. If, therefore, the device is not being used for recording purposes, the film 9 need not pass over roller 29 (such passage bringing the film into operative contact with the recording head 25 and the erasing head 26) but instead may contact substantially the entire surface of drum 10 until it leaves such surface and passes over idler roller 29′ at which point the film is brought into operative proximity with the pickup head 27. When it is not desired to use the pickup head 27 then the film can pass beneath roller 29′ and maintain its contact with the surface of the drum 10.

Particular attention is drawn to the stabilizing rollers 17 and 17′ which are in yielding contact with the outer surfaces of the film extending between the driven sprocket 16 and the drum 10. It will be noted that these stabilizing rollers are carried upon stub shafts 33 extending through horizontally disposed slots 34 in the supporting panel. Each stub shaft 33 is carried by the upper end of a bell crank lever 34′. Each bell crank is provided with a long arm and a short arm, the short arm being indicated at 35. The stub shafts 33 are mounted at the end of the longer arm. Each bell crank lever 34′ is pivotally supported upon a stud 36, the studs 36 and 36′ being located on opposite sides of a center line connecting shaft 11 with the drive shaft 46 of the sprocket 16. It may also be noted that these points of pivotal connection 36 and 36′ are spaced a distance materially less than the diameter of drum 10, such distance approximating the diameter of the driving sprocket 16.

The outwardly directed short arms 35 of the bell crank levers are each connected by means of a spring 37 to an adjustment rod 38 carried by a bracket 39 fastened to the back of the panel. The two springs and adjustment rods are preferably in substantially parallel relation and are parallel to the center line joining shaft 11 of the drum 10 with the driving shaft 46 of sprocket 16.

It will be noted that this arrangement places the stabilizing rollers 17 and 17′ in close proximity to the surface of the drum 10 and the movement of the stabilizing rollers is in a plane substantially tangent to the surface of the drum 10 and between such drum and the driving sprocket 16. It has been found that this arrangement is extremely efficient in maintaining proper contact with the drum 10 and in eliminating the formation of loops and in absorbing flutter or other variations in linear speed of the film 9.

The shaft 46 of the driving sprocket 16 is suitably journaled as in a bearing 42 carried by the panel 13. This shaft 46 is connected to a cup-shaped element 43 carried by a torque shaft 44, in alignment with shaft 46, by means of a transversely extending strip of resilient metal 45 (see Figs. 4 and 6). The strip of metal 45 is preferably flat, lies in a plane transverse to the shaft 46 and is connected to the shaft 46 at its center and to the edges of the cup-shaped member 43. It should be capable of a certain amount of flexure in the event torque shaft 44 moves toward or away from drive shaft 46. The other end of the torque shaft 45 is provided with a similar but larger cup-shaped member 47 which is connected to a hollow quill 50. The adjacent end of quill 50 carries an outwardly flanged coupling 51, the margins of such coupling being connected to the outer margins of the element 47 by means of a pronged resilient connector having arms 48 and a center ring 49. The ends of the arms 48 are connected to the cup 47 whereas the ring 49 is connected to 51. The connector arms transmit rotation from the quill to the torque shaft 44 while absorbing and damping vibration.

The quill 50 is journaled in a gear case 52 and may be provided with a worm gear 53 in operative engagement with a worm 54 carried by the shaft of a motor 55 suspended from shock absorbing mounts 56 carried by a suitable bracket or other support 57.

The present arrangement does not employ a dashpot or other resistive element for damping, as in the case of several prior tightloop film transporting mechanisms. It will also be noted that, in the instant arrangement, the upper ends of springs 37 are fastened to the frame and this results in a non-linear compliance of the springs, permitting them to act as "soft" limiters to large amplitude variations of the arms 34 upon which rollers 17 are mounted. Primary damping in the instant system is attained by utilizing the resistance of film to flexure; as the rollers 17 approach, or recede from each other, the amount of film wrapped around drum 10 and each of rollers 17 is appreciably changed. The present arrangement therefore uses the resistance to variable flexure of the film as damping and the compliances are operated as non-linear elements limiting large amplitude oscillations, thus giving the effect of additional damping in reaching stable operating conditions.

Although a specific example has been described in detail so that those skilled in the art may readily appreciate the advantages and attain the same, various changes and adaptations are contemplated and will readily occur to skilled technicians, and all changes and modifications utilizing the teachings of this invention and coming within the scope of the appended claims are embraced thereby.

I claim:

1. In a sound recording and reproducing apparatus: a freely-journaled, smooth-surfaced, weighted recording and reproducing drum, arranged to frictionally receive strip film over the major portion of its periphery; a shielded pickup case surrounding said drum, and including a head mounting plate in a plane transverse to the axis of the drum; means for adjustably positioning said mounting plate in a selected plane transverse to the drum axis; a magnetic head carried by the plate with its face out of operative range of film on said drum; an idler roller journaled in proximity to said drum and head, said roller being positioned to divert film from and return the film to said head whereby the film so diverted by the roller passes in operative relation to the head.

2. In a sound recording and reproducing apparatus: a freely journaled, smooth surfaced, weighted, recording and reproducing drum arranged to frictionally receive strip film over the major portion of its periphery; a driving sprocket mounted upon a shaft parallel to the axis of the drum and spaced therefrom, said sprocket being arranged to engage strip film passing thereover on the way to and returning from said drum; a pair of stabilizing rollers, each in yielding contact with the outer surface of a lay of film extending between the sprocket and drum; means for yieldably urging said rollers toward each other and means restricting motion of said rollers to a path virtually transverse to a line connecting the axes of the drum and sprocket and in close proximity to the drum; a shielded pickup case surrounding said drum and including a head mounting plate in a plane transverse to the axis of the drum and means for adjustably positioning said mounting plate in a selected plane transverse to the drum axis; a magnetic head carried by the plate with its face out of operative range of film on said drum; and an idler roller journaled in proximity to said drum and head, said roller being positioned to divert film from and return the film to said head, whereby the film so diverted by the roller passes in operative relation to the head.

3. In a sound recording and reproducing apparatus: a freely-journaled, smooth-surfaced, weighted recording and reproducing drum, arranged to frictionally receive strip film over the major portion of its periphery; a driving sprocket mounted upon a shaft parallel to the axis of the drum and spaced therefrom, said sprocket being arranged to engage strip film passing thereover on the way to and returning from said drum; adjustable means for releasably holding film in engagement with the sprocket; a pair of stabilizing rollers movably positioned between the drum and sprocket, each stabilizing roller being in yielding contact with the outer surface of a lay of film extending between the sprocket and drum; separate spring means for yieldably urging each of said rollers toward the other and means restricting motion of said rollers to a path virtually transverse to a line connecting the axes of the drum and sprocket and in close proximity to the drum to vary the amount of strip film in contact with the drum; a shielded pickup case surrounding said drum and including a head mounting plate in a plane transverse to the axis of the drum, and means for adjustably positioning said mounting plate in a selected plane transverse to the drum axis.

4. In a sound recording and reproducing apparatus: a freely-journaled, smooth-surfaced weighted recording and reproducing drum, arranged to frictionally receive strip film over the major portion of its periphery; a driving sprocket mounted upon a shaft parallel to the axis of the drum and spaced therefrom, said sprocket being arranged to engage strip film passing thereover on the way to and returning from said drum; adjustable means for releasably holding film in engagement with the sprocket; a pair of stabilizing rollers movably positioned between the drum and sprocket, each stabilizing roller being in yielding contact with the outer surface of a lay of film extending between the sprocket and drum; separate spring means for yieldably urging each of said rollers toward the other and means restricting motion of said rollers to a path virtually transverse to a line connecting the axes of the drum and sprocket and in close proximity to the drum to vary the amount of strip film in contact with the drum; a shielded pickup case surrounding said drum and including a head mounting plate in a plane transverse to the axis of the drum, and means for adjustably positioning said mounting plate in a selected plane transverse to the drum axis; a magnetic head carried by the plate with its face out of operative range of film on said drum; and an idler roller journaled in proximity to said drum and head, said roller being positioned to divert film from and return the film to said head whereby the film so diverted by the roller passes in operative relation to the head.

ARTHUR CHAS. DAVIS.

References Cited in the file of this patent

UNITED STATES PATENTS

| Number | Name | Date |
|---|---|---|
| 680,315 | Collins | Aug. 13, 1901 |
| 766,261 | Jebsen | Aug. 2, 1904 |
| 1,777,682 | Sponable | Oct. 7, 1930 |
| 1,996,732 | Whitman | Apr. 2, 1935 |
| 2,251,322 | Buhrnedorf | Aug. 5, 1941 |
| 2,266,755 | Herzig | Dec. 23, 1941 |
| 2,273,391 | Yerkovich | Feb. 17, 1942 |
| 2,408,320 | Kuhlik | Sept. 24, 1946 |
| 2,430,449 | Brown | Nov. 11, 1947 |
| 2,463,411 | Mynard | Mar. 1, 1949 |
| 2,518,556 | Kalb et al. | Aug. 15, 1950 |

FOREIGN PATENTS

| Number | Country | Date |
|---|---|---|
| 650,072 | Germany | Sept. 16, 1937 |
| 64,146 | Norway | Nov. 10, 1941 |